United States Patent [19]

Al-Attar

[11] Patent Number: 4,807,462
[45] Date of Patent: Feb. 28, 1989

[54] METHOD FOR PERFORMING AUTOMATIC CALIBRATIONS IN AN ELECTRONIC COMPASS

[75] Inventor: Rafi Al-Attar, Southfield, Mich.

[73] Assignee: Chrysler Motors Corporation, Highland Park, Mich.

[21] Appl. No.: 34,134

[22] Filed: Apr. 3, 1987

[51] Int. Cl.$^4$ .............................................. G01C 17/38
[52] U.S. Cl. ...................................... 73/1 E; 364/559; 364/571.03; 33/356; 33/361
[58] Field of Search ............... 73/1 E; 33/355 R, 356, 33/363 R, 363 Q, 357, 361, 362; 364/559, 571

[56] References Cited

U.S. PATENT DOCUMENTS

| | | | |
|---|---|---|---|
| 3,683,668 | 8/1972 | Baker et al. | 73/1 E |
| 3,899,834 | 8/1975 | Harrison, Jr. | 33/361 X |
| 3,943,763 | 3/1976 | Garner | 73/178 R |
| 3,991,361 | 11/1976 | Mattern et al. | 33/356 X |
| 4,143,467 | 3/1979 | Erspamer et al. | 33/356 |
| 4,227,404 | 10/1980 | West | 73/151 |
| 4,347,730 | 9/1982 | Fisher et al. | 73/1 E |
| 4,424,631 | 1/1984 | FRanks | 33/361 |
| 4,425,717 | 1/1984 | Marcus | 33/361 |
| 4,505,054 | 3/1985 | Clark et al. | 33/357 |
| 4,539,760 | 9/1985 | Marchent et al. | 33/356 |
| 4,546,550 | 10/1985 | Marchent et al. | 33/356 |
| 4,546,551 | 10/1985 | Franks | 33/356 |
| 4,611,293 | 9/1986 | Hatch et al. | 364/571 |
| 4,622,646 | 11/1986 | Waller et al. | 73/1 E X |
| 4,622,843 | 11/1986 | Hormel | 73/1 E |
| 4,677,754 | 7/1987 | Hormel | 33/361 |
| 4,720,992 | 1/1988 | Hormel | 73/1 E |
| 4,738,031 | 4/1988 | Alberter et al. | 33/361 X |
| 4,750,349 | 6/1988 | Luitje | 73/1 E |

FOREIGN PATENT DOCUMENTS 1964569 11/1976 Fed. Rep. of Germany .... 33/355 R

OTHER PUBLICATIONS

Article Entitled: "A magnetic Heading Reference for the Electro Fluidic Auto Pilot"; part I; by Howell D. Garner from *Sport Aviation;* Nov. 1981.
Article Entitled: "A Magnetic Heading Reference for the Electro Fluidic Auto Pilot"; Part II; by Howell D. Garner from *Sports Aviation;* Dec. 1981.
Article Entitled: "Magnetic Field Sensor and Its Application to Automobiles" by Hisatsugu Itoh, dated Feb. 1980, and published by the Society of Automotive Engineers as Paper No. 800123.

*Primary Examiner*—Tom Noland
*Attorney, Agent, or Firm*—Mark P. Calcaterra

[57] ABSTRACT

The method and system described herein calls for the calibration of an electronic compass without using the operator of the vehicle in the process. This eliminates the need for the operator of the vehicle to help to supply information relating to the earth's unknown magnetic field as sensed from the frame of reference of the vehicle in which the electronic compass resides. The method does not need to make use of the unknown magnetic field due to the earth (as sensed from the frame of reference of the vehicle in which the electronic compass resides) in the process of automatically calibrating the compass. This magnetic field, although unknown, is utilized by viewing the position of the vehicle with respect to the earth's field, thereby eliminating the effect on the compass computation of the earth's magnetic field as sensed in the vehicle.

12 Claims, 4 Drawing Sheets

Each position the car (with the Compass) takes is assigned a magnetic field point by the Compass. The angle θ between car positions is equal to angle θ on the circle. The same thing is true for angle φ, where θ and φ could be any value and θ ≠ φ.

Automatic Calibration for Vehicle Compass

Point C is the midpoint between Point 1 and 2.
Point S is the midpoint between Point 2 and 3.

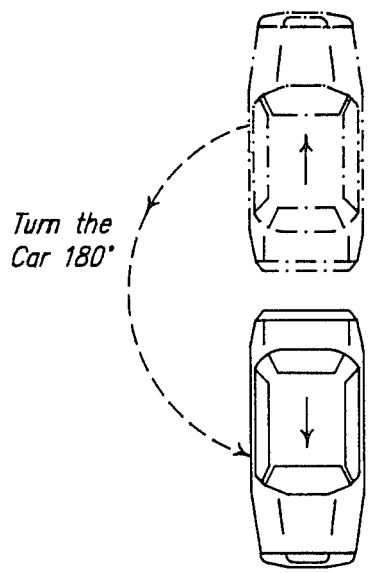
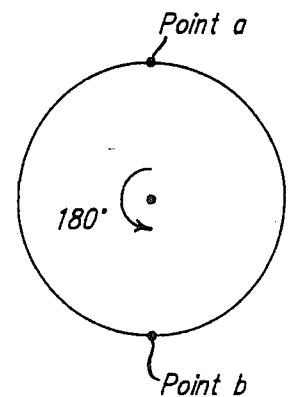

The magnetic field sensed by the compass changes from Point a to Point b when the car is turned 180°.

Manual Calibration for Vehicle Compass

*Prior Art*

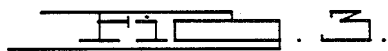

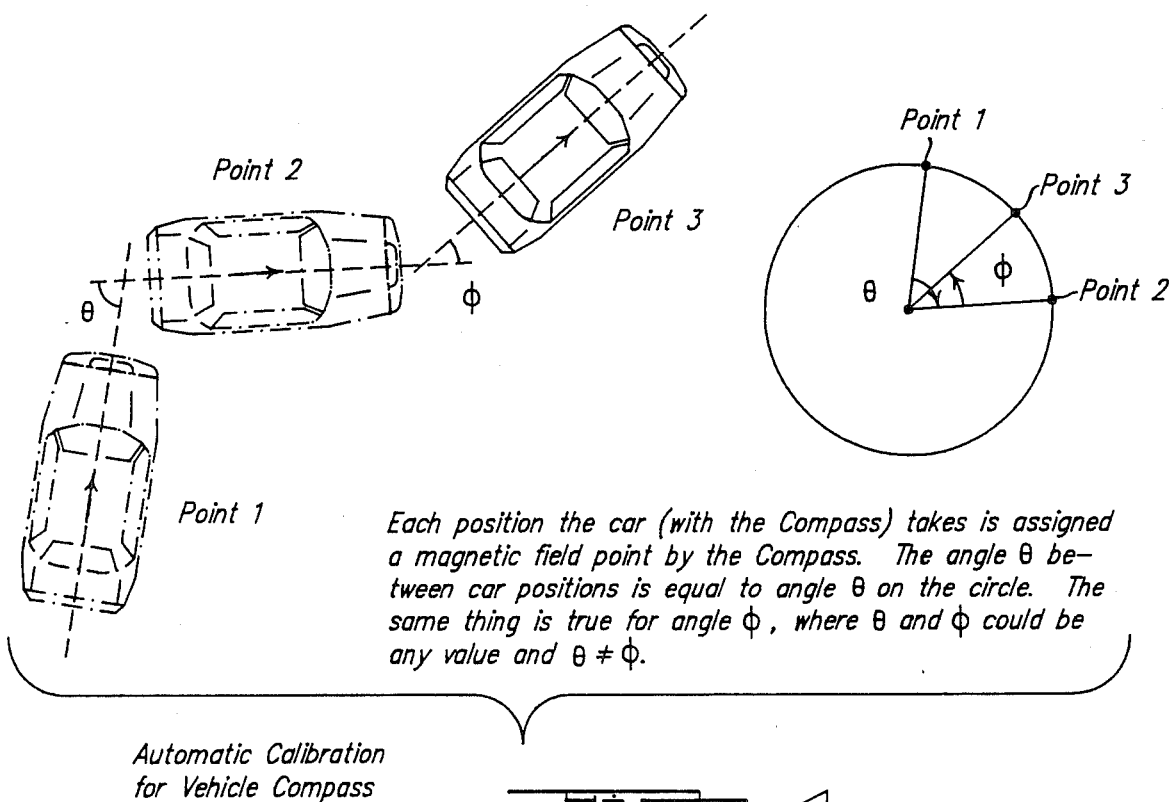

Each position the car (with the Compass) takes is assigned a magnetic field point by the Compass. The angle θ between car positions is equal to angle θ on the circle. The same thing is true for angle φ, where θ and φ could be any value and θ ≠ φ.

Automatic Calibration for Vehicle Compass

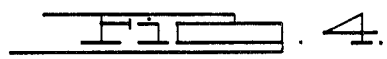

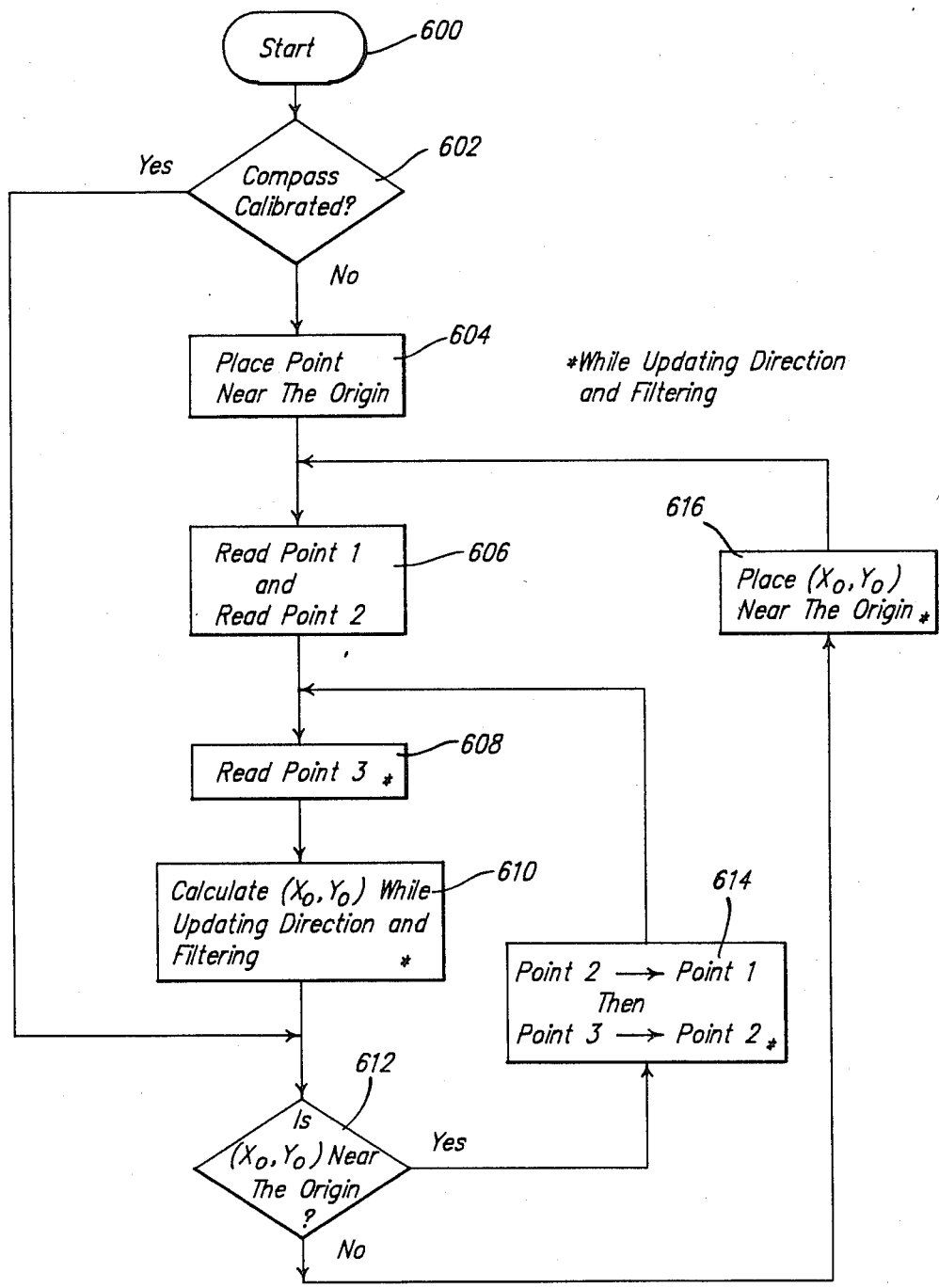

METHOD FOR PERFORMING AUTOMATIC CALIBRATIONS IN AN ELECTRONIC COMPASS

BACKGROUND OF THE INVENTION

1. Field of the Invention

This invention relates to automatically calibrating an electronic compass in a vehicle, especially an automotive vehicle. The invention eliminates the need for an intervention by the operator of the vehicle in the calibration process. Thus the calibration is done automatically thereby reducing chances for error and providing a more accurate calibration on a continuous or periodic basis without the intervention of the operator of the vehicle.

2. Description of Related Art

The subject invention is closely related to and is an improvement to the system described in commonly assigned U.S. Pat. No. 4,622,843 to Hormel on Nov. 18, 1986 and two other commonly assigned U.S. patent applications, U.S. Ser. No. 06/814,125 (now U.S. Pat. No. 4,677,754; 07/07/87), "The Multiplexing Of A Bandpass Filter Circuit To Work With A Flux-Gate Sensor Output" also to Hormel, and U.S. Ser. No. 06/814,133, now U.S. Pat. No. 4,750,349; 6/14/88, "Microcomputer Controlled Quick Ranging Technique And Digital Filter" to Luitje. All three of these documents were filed in the U.S. Patent & Trademark Office on Dec. 27, 1985 and the entire contents of these three documents are hereby expressly incorporated by reference.

More specifically, the subject invention is an improvement to the calibration method claimed in copending, commonly assigned U.S. Ser. No. 06/931,766, now U.S. Pat. No. 4,720,992; 1/26/88, "Calibration Sequence And Method For An Electronic Compass," filed on Nov. 17, 1986, which is also hereby expressly incorporated by reference.

Attention is invited to the Ser. No. 06/931,766 application. There, a calibration sequence and method is disclosed and claimed for use with an electronic compass. The sequence and method allows for the separation of the vehicle's magnetic field from the earth's magnetic field so that the earth's field can be measured and used to indicate vehicle direction; such calibration sequence being done with a mirrored 180 degree reorientation of the vehicle. See FIG. 3 herein for an illustration.

Other related art to the invention is contained in the following publications: "Magnetic Field Sensor And Its Application To Automobiles," SAE Paper No. 800123, pages 83 through 90, February 1980 by Hisatsugu Itoh; and "A Magnetic Heading Reference For The Electro/Fluidic Auto Pilot,"*Sport Aviation*, by Doug Garner, Part I, pages 19 through 26, November 1981 and Part II, pages 20–32 and page 51 in the December 1981 issue. Both of these documents are also hereby expressly incorporated by reference.

Other patents found by applicant or by the examiners in these commonly assigned patent and applications are listed in applicant's information disclosure statement. The relevance of these documents are dealt with in the respective files.

SUMMARY OF THE INVENTION

The method and system described herein calls for the calibration of an electronic compass without using the operator of the vehicle in the process. Formerly, the operator of the vehicle was involed in the calibration process by supplying information and/or by becoming actively involved with the process by orienting the vehicle in a predetermined format.

In other words, the subject invention eliminates the need for the operator of the vehicle to help to supply information relating to the earth's unknown magnetic field as sensed from the frame of reference of the vehicle in which the electronic compass resides. The method does not need to make use of the unknown magnetic field due to the earth (as sensed from the frame of reference of the vehicle in which the electronic compass resides) in the process of automatically calibrating the compass. This magnetic field, although unknown, is utilized by viewing the position of the vehicle with respect to the earth's field, thereby eliminating the effect on the compass computation of the earth's magnetic field as sensed in the vehicle.

The method essentially takes advantage of the mathematical principles involved with perpendicular bisectors to chords of a circle to compute the center of the earth's field circle, independent of the magnetic field generated by the vehicle itself. The chords define points measured by the electronic compass, and contained on a circle whose center is the tip of a magnetic field vector due to the vehicle's magnetic field with respect to the earth's magnetic field as sensed in the flux-gate sensor of the vehicle.

The reason that previous systems need the intervention of the operator in the calibration process is that the earth's magnetic field as sensed in the vehicle was unknown to the electronic compass and was used in the calibration process. If the earth's magnetic field as sensed in the vehicle is taken out of the process, the operator will be freed from this calibration chore.

The subject invention finds an origin which is a zero output of the magnetic flux-gate sensor which outputs a zero in the situation of a net resultant of zero magnetic field as detected by the magnetic flux-gate sensor.

The invention further seeks to use the found center of the earth's magnetic field circle to compute the directional offset values used in the magnetic compass heading computations as described in the '843 patent to Hormel and, more specifically shown in blocks 368 and 370 and the accompanying description and figures of the '843 patent which has been incorporated by reference. Further attention is invited to the description in column 13 of the '843 patent circa lines 47–64.

The present application discloses a method of improve upon the manual, mirrored 180 degree re-orientation calibration sequence/method by eliminating the need for operator involvement in the calibration process. It eliminates the need to turn the vehicle in any prescribed manner or sequence and eliminates the need to push switches or buttons in response to prompts from the microprocessor controlling the compass. The calibration process is performed automatically, as called for continuously or periodically by the microprocessor thereby improving the accuracy of the compass.

DESCRIPTION OF THE DRAWINGS

Other objects, features and advantages of the present invention will become more fully apparent from the following detailed description of the preferred embodiment, the appended claims and in the accompanying drawings in which:

FIG. 3 illustrates the turning of a vehicle during a manual calibration of a vehicle compass;

FIG. 4 illustrates vehicle movement typical of that observed during an automatic calibration of a vehicle's electronic compass according to the present invention;

FIG. 6 is a flowchart showing an alternative method of automatic calibration of a vehicle compass disclosed herein.

DETAILED DESCRIPTION OF THE PREFERRED EMBODIMENT

Figure 1:
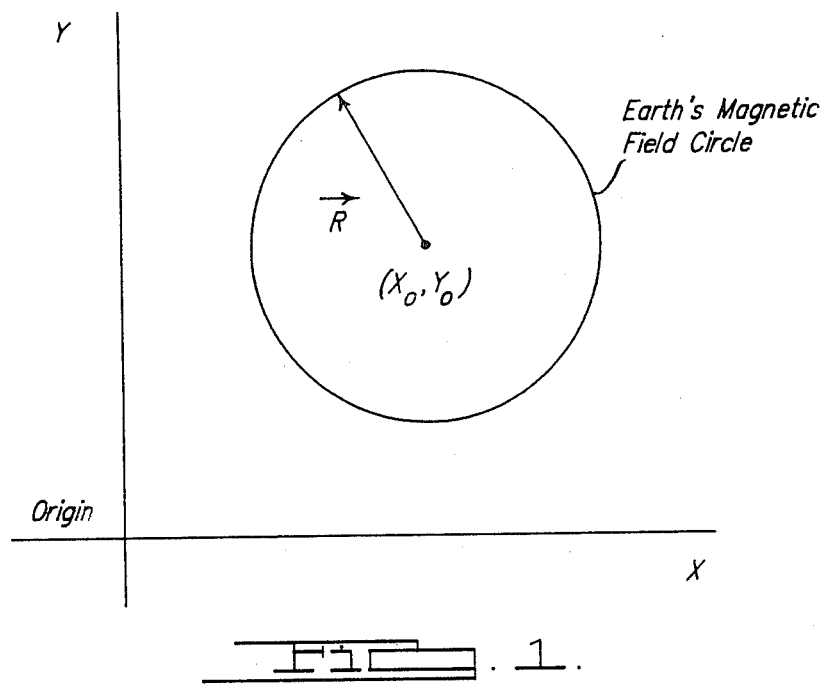
FIG. 1 shows cartesian X,Y axes with a defined point origin representing a zero magnetic field as sensed by the flux gate, also shown is the earth's field circle with center $X_0$, $Y_0$ and the vector "R" which represents the radius of the earth's field circle.

Referring to FIG. 1, the Cartesian X,Y axes are illustrated, along with the defined origin representing a sensed zero magnetic field from the flux-gate 42 as shown in FIG. 1 and FIG. 2A of the Hormel/Luitje documents incorporated by reference.

Also illustrated in FIG. 1 is the earth's field circle and its center represented by the Cartesian coordinates ($X_0$, $Y_0$).

Figure 2:
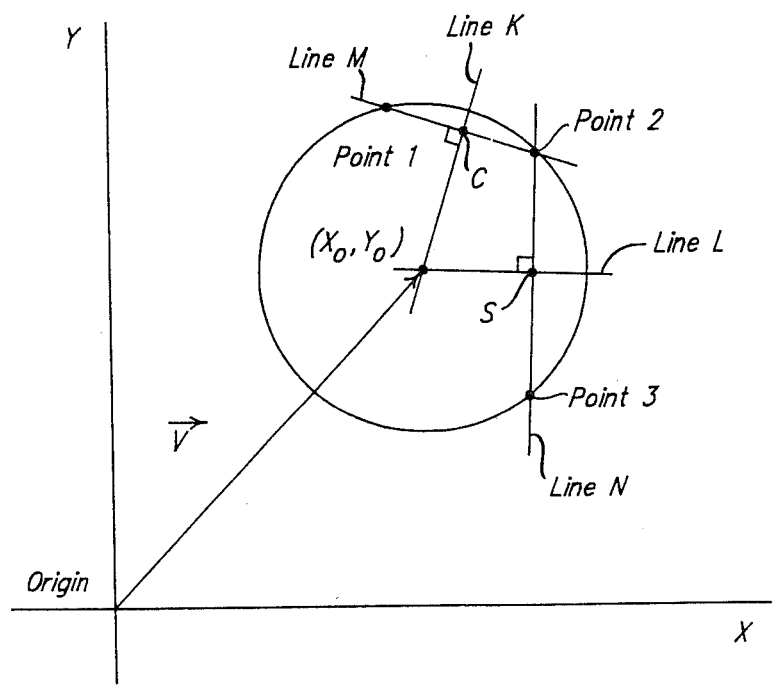
FIG. 2 shows the same cartesian axes, the earth's field circle, two chords and perpendicular bisectors of each chord.

Referring now to FIG. 2, the same Cartesian axes are illustrated, along with the earth's field circle and its center ($X_0$, $Y_0$). In addition, shown are two chords of the earth's field circle. These are represented as lines M and N. Line M is formed by point 1 and point 2 on the circumference of the earth's field circle, and line N is defined by point 2 and point 3, also a chord of the earth's field circle.

Point 1, point 2 and point 3 are three location points as read by the electronic compass as the vehicle moves about its journey. In other words, as the vehicle turns direction a new point is measured and captured through the use of the electronic compass as described in the documents incorporated by reference. These three points are utilized in the auto-calibration procedure described herein.

Once the three points have been captured in the memory of the electronic control system as described in the documents incorporated by reference, a perpendicular bisector of each chord is defined from the chords.

In the situation described in FIG. 2, the perpendicular bisectors represented as line K and line L, line K perpendicularly bisecting line M, and line L perpendicularly bisecting line N.

By definition, the perpendicular bisector of a chord of a circle intersects other perpendicular bisectors of other chords of the same circle at the center of the circle. Therefore, the center of the circle ($X_0$, $Y_0$) can be defined by line K and line L.

The intersection of these two perpendicular bisectors is the center of the circle ($X_0$, $Y_0$). More than three points can be utilized for this purpose and an example utilizing four points is shown in the following description, but the theory remains the same.

The method described here for calibrating an electronic compass (which is actually finding the location of the center of the circle spanning by the earth's field), when incorporated, allows an automatic process of continuously updating the center of the earth's circle whenever the vehicle (which has the compass on it) makes any turn. This means that the compass continuously calibrates itself while driving the vehicle and its does it on its own without interference from the driver.

The earth's magnetic field sensed by an electronic compass in a vehicle, with a present sheet metal magnetic field, is a vector that spans a circle. As the car turns, the vector spans the earth's field circle. This is shown in FIG. 1.

The calibration process of such a field is done by finding the center of the earth's field circle ($X_0$, $Y_0$).

Only three points distributed randomly on the circumference of the circle are needed to find the center point of the circle ($X_0$, $Y_0$) at any time instant. This method can be applied also to four or more points.

In principle, the center of a circle is the intersection point of the two lines perpendicular to two line sectors on the circumference of the circle given that each one of the two perpendicular lines must pass through the midpoint of the corresponding sector line perpendicular to it. This is shown in FIG. 2.

In qualitative analysis, the center point of a circle can be found from solving for the intersection point of two non-parallel line equations K, L. These two line equations are the orthogonal line equations for two different line equations M, N. Line M passes through point 1 and point 2 whereas line N passes through point 2 and point 3. The two lines K, L must pass through the midpoint of lines M, N, respectively. This is shown in FIG. 2. The following equations describe quantitatively how ($X_0$, $Y_0$) is obtained given only three points P1, P2 and P3.

The equation of the line connecting two points ($x_1$, $y_1$) and ($x_2$, $y_2$) together is given by:

$$y = [(y_2 - y_1)/(x_2 - x_1)]x + y_1 - [(y_2 - y_1)/(x_2 - x_1)]x_1 \quad \text{EQ 1}$$

EQ 1 is found by substituting the points ($x_1$, $y_1$) and ($x_2$, $y_2$) into a given line equation:

$$y = mx + b, \quad \text{EQ 2}$$

where m is the slope and b is the y intercept, thereby getting two equations, one for each point. Solving them simultaneously to derive an expression for m and one for b in terms of the points yields EQ 1. Taking EQ 2 and using it to find the equation of a line normal to it yields:

$$y = -(x/m) + k \quad \text{EQ 3}$$

which is the normal line equation where k is the y intercept constant. If ($x_i$, $y_i$) is the center point on the line of equation 2 (above), then the normal line equation 3 (above) becomes:

$$y = -(x/m) + y_i + (x_i/m) \quad \text{EQ 4}$$

Finding the center of the circle ($X_0$, $Y_0$) required solving for the intersection of two lines which is done as follows (assume two non-parallel lines are given):

$$y = m_1 x + b_1$$

$$y = m_2 x + b_2$$

set the two y+s equal to get the intersection point $$m_1 x + b_1 = m_2 x + b_2$$

$$x(m_1 - m_2) = b_2 - b_1 \text{ or}$$

$$x = [(b_2 - b_1)/(m_1 - m_2)] = x_0 \qquad \text{EQ 5}$$

and solving for $y_0$:

$$y_0 = m_1 x_0 + b_1 \qquad \text{EQ 6}$$

Applying the above calculations to the case of four random point $(x_1, y_1)$, $(x_2, y_2)$, $(x_3, y_3)$, $(x_4, y_4)$, we get the equations:

$$y = [(y_2 - y_1)/(x_2 - x_1)]x + y_1 - [(y_2 - y_1)/(x_2 - x_1)]x_1; \qquad \text{EQ 7}$$

for
Line M from equation 1 above and $$y = [(y_4 - y_3)/(x_4 - x_3)]x + y_3 - [(y_4 - y_3)/(x_4 - x_3)]x_3; \qquad \text{EQ 8}$$

for Line N from equation 1 above. The equations for the normal lines K, L (normal to the lines M, N) are then given by equation 4 as:

$$\{\text{Line K}\}: y = (-x/m_1) + y_a + (x_a/m_1); \qquad \text{EQ 9}$$

for Line M and $$\{\text{Line L}\}: y = (-x/m_2) + y_b + (x_b/m_2); \qquad \text{EQ 10}$$

for line N.
Substituting these two equations in equation 5 and equation 6, we get:

$$x_0 = [(b_2 - b_1)/(m_1 - m_2)] = \qquad \text{EQ 11}$$

$$\frac{y_b + [(x_4 - x_3)/(y_4 - y_3)]x_b - [y_a + [(x_2 - x_1)/(y_2 - y_1)]x_a]}{[(x_4 - x_3)/(y_4 - y_3)] - [(x_2 - x_1)/(y_2 - y_1)]}$$

$$y_0 = -[(x_2 - x_1)/(y_2 - y_1)]x_0 + y_a + [(x_2 - x_1)/(y_2 - y_1)]x_a \qquad \text{EQ 12}$$

where $x_a = (x_1 + x_2)/2$; $x_b = (x_3 + x_4)/2$; $y_a = (y_1 + y_2)/2$; $y_b = (y_3 + y_4)/2$.

If we consider the case of only 3 given points, then: $(x_1, y_1)$, $(x_2, y_2)$, $(x_3, y_3)$, then the following need to be calculated which are put in a simple form for computer programming:

$x_a = (x_1 + x_2)/2$; $x_b = (x_2 + x_3)/2$;
$y_a = (y_1 + y_2)/2$; $y_b = (y_2 + y_3)/2$;
$t_a = (x_2 - x_1)/(y_2 - y_1)$; $t_b = (x_3 - x_2)/(y_3 - y_2)$;
$w_a = y_a + t_a x_a$; $w_b = y_b + t_b x_b$;
$x_0 = (w_b - w_a)/(t_b - t_a)$ and
$y_0 = w_a - t_a x_0$ where $(x_0, y_0)$ is the center of the circle which had the three points on its circumference.

The now known center $(x_0, y_0)$ is used to compute the directional offset values used in the magnetic compass heading computations as described in the '843 patent to Hormel and, more specifically shown in block 368 and block 370 and in the accompanying description and figures of the '843 patent which has been incorporated by reference.

By way of an amplification to what has already been said in the body of the '843 specification, a brief restatement of some of these items will help focus attention in on the points of novelety of the Ser. No. 06/931,766 application and the improvements of the present invention.

Calibration is necessary to separate the vehicle's magnetic field from that of the earth's magnetic field so that the earth's field can be measured and used to give vehicle direction.

The earth's magnetic field is stationary to the earth, but the vehicle's magnetic field is stationary to the vehicle. The magnetic fields are measured as vectors with direction and magnitude on each. The compass measures only the resultant of the summation of the two vectors which is the sum of the earth's and the vehicle's magnetic fields. When the two vectors of equal magnitude and opposite direction (180 degrees apart) are added together, the resultant is zero (0). The compass measures the magnetic field relative to the vehicle when these vectors are added together according to the formulas described in the specification. The compass calibration sequence starts with the vehicle in any direction and actuation of the calibration button by the operator of the vehicle. At this first point, the compass electronics measures and records the resultant magnetic field.

The vehicle is then moved to a second location which is rotated 180 degrees from the first location. The calibration button is re-actuated by the operator of the vehicle and the resultant magnetic field is again measured and recorded.

The only difference between the two resultant magnetic field measurements is that the effects of the earth's field was rotated 180 degrees in the second measurement. Now, if the two resultants are added together, the effects of the earth's magnetic field vectors will cancel out because they were equal in magnitude and measured 180 degrees apart. The sum of the resultant will, therefore, be twice the vehicle's magnetic field.

The resultant sum, when divided by two, will give the vehicle's magnetic field (offset). This completes the calibration sequence. Now, from any compass reading, the vehicle's magnetic field is subtracted and the result will be the earth's magnetic field which is needed to indicate the direction.

The above amplification further explains the use of the offset parameter as in the '843 patent and in the Ser. No. 06/731,966 application's description of the calibration sequence that precedes the formula. In more arithmetic terms, if the vector representing the vehicle's magnetic field is represented by a "V" and the vector representing the earth's magnetic field is represented by an "E", then the first reading described above would be equivalent to the vector sum of "V+E." The second vector sum of the readings taken above would be the vector sum of "V−E." When these two quantities are added together, the "E" terms numerically and vectorially are cancelled out in the summation and the resultant is equal to the vector "2V." This quantity is then divided by two. The resultant is the vector "V" and this represents the vehicle offset which is, in other words, the vehicle's magnetic field which is subtracted from any compass reading that the electronic compass, as described elsewhere in the '843 and '766 specifications, reads and computes.

The present invention calibrates the electronic compass without operator intervention and computes a vehicle offset vector "V." This vector represents the vehicle's magnetic field with respect to the earth's magnetic field. Vector "V" is subtracted from any compass reading.

Vehicle offset vector "V" is shown on FIG. 2 with its beginning point at the origin and its ending point at $(x_0, y_0)$. This means that the axes shown in FIG. 1 and FIG. 2 represent the frame of reference of the vehicle as viewed (sensed) by the flux gate sensor. The vector "R" as shown in FIG. 1 is the radius of the earth's field circle.

Referring now to FIG. 3, shown is a way to calibrate the compass with a mirrored 180 degree turn of the vehicle and operator involvement. Two points, a and b, are measured. The magnetic field sensed by the compass changes from point a to point b when the vehicle is turned 180 degrees. This type of calibration is explained herein in the summary of the invention section and in commonly assigned application Ser. No. 06/931,766 filed on Nov. 17, 1986, now U.S. Pat. No. 4,720,992; 1/26/88 which has been incorporated by reference. Briefly said, the operator positions the car and starts the manual calibration by pushing a button and awaiting the compass to tell him to turn the car to a predetermined 180 degree line. The operator pushes a button to let the compass know that he turned the car 180 degrees and the compass finishes the calibration. Note also that if the turn is not equal to 180 degrees, the calibration is incorrect.

Referring now to FIG. 4, shown is the movement of a vehicle equipped with an electronic compass. Also shown are the points sensed by the electronic compass during the automatic calibration. Each position the vehicle takes is assigned a magnetic field point by the compass. The angle theta between vehicle positions is equal to the angle theta on the circle. The same thing is true for angle phi, where theta and phi could be any value so long as theta is not equal to phi.

According to the present invention, the electronic compass does the calibration automatically, on its own, every time the vehicle takes a different route while driven. That is, a random route is perfectly acceptable and replaces the predetermined 180 degree turn of some other systems and of a predetermined 360 degree turn of still other systems. Therefore, the compass is continuously updating its calibration value. The calibration is totally independent of the operator and therefore is always accurate. Of course, the operator can be allowed to request a calibration at any time but such is merely for operator satisfaction as the automatic calibration is performed continuously as presently envisioned in the subject embodiment.

Referring again to FIG. 4, of note is that the direction the vehicle takes is unimportant for the calibration. Translating this to the angles in FIG. 4, the direction of sweep of radius vector between ($x_0, y_0$) and the circumference of the earth's field circle is unimportant. All that is necessary to know is the point the flux gate senses on the field circle as the vehicle changes direction. That is, since the x,y coordinates are used, the direction of sweep between the angles is not important, only the magnitude and direction of the resultant radius vector of the field circle. The angles theta and phi will not exceed 180 degrees due to structure of the electronics as described in the documents incorporated by reference.

The following flowchart is spanned by the microcomputer or microprocessor. In addition, the UP or UC should constantly find and display the geographic direction. This flowchart shows the general procedure of using the discussed method plus a special compensation scheme for a full operational self-calibrating vehicle compass.

Figure 5:
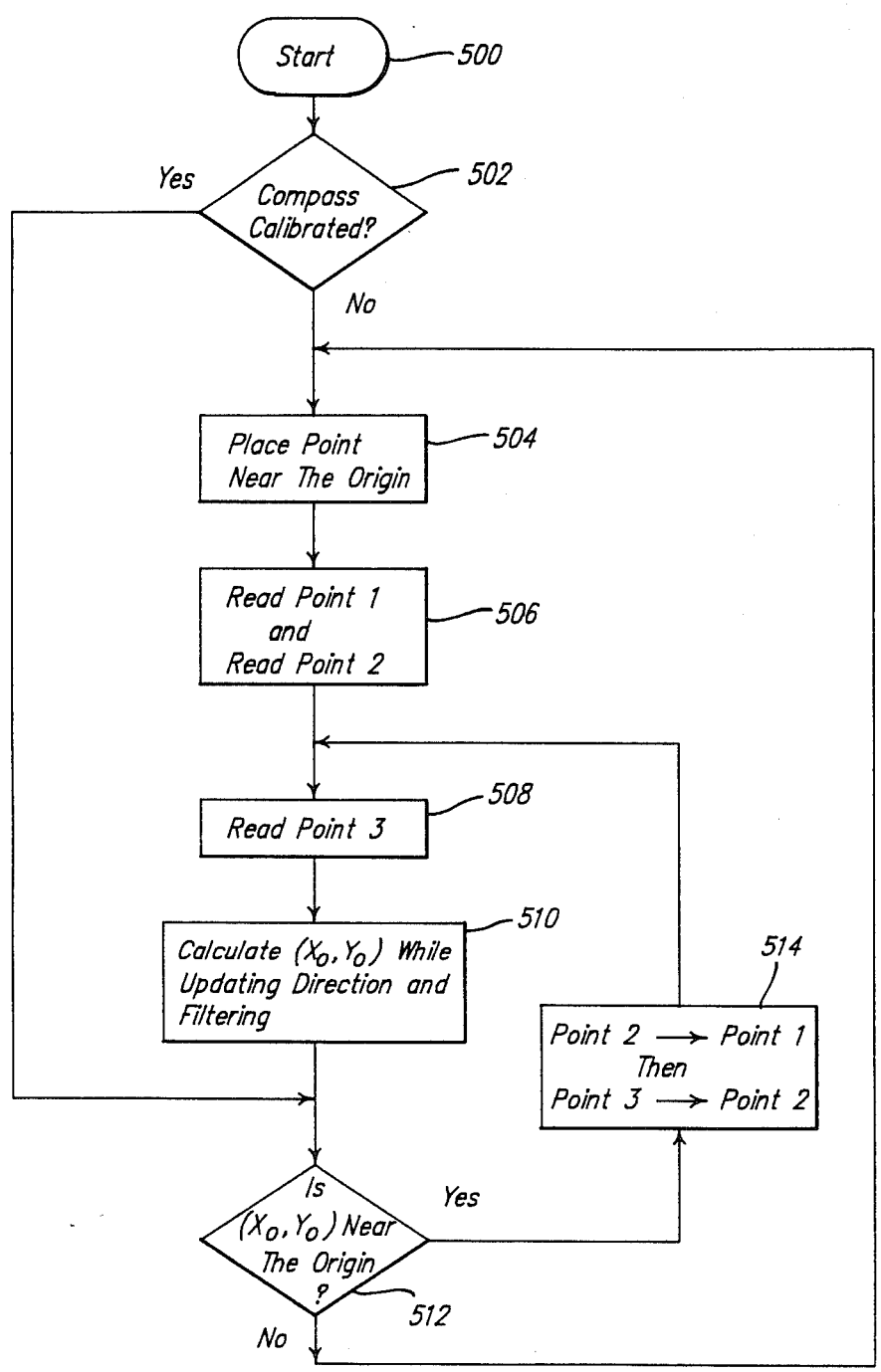
FIG. 5 is a flowchart of the method of automatic calibration of a vehicle compass disclosed herein.

Before referring to FIG. 5 in the subject application, attention is invited to FIG. 5A and FIG. 5B of the '843 patent to Hormel. The subject invention can be used in the same system described in the '843 patent and will find itself supplanting all of the software calibration and ranging technique blocks as shown in FIGS. 5A and 5B of the '843 patent stopping at block 368. In other words, the following description will be the blocks preceding the blocks 368 and 370 in FIG. 5B of the '843 patent.

Referring now to FIG. 5 in the subject invention, the automatic calibration procedure is begun in block 500. First, the compass calibration is checked in block 502. This is done by reading a preset flag in the memory of microprocessor 10 as shown in the '843 patent. This is a flag and is a preset initial calibration condition. It represents a condition that will never occur in the use of the compass and it will indicate that the compass is out of calibration. This preset condition is only used when the electronic compass is first energized after manufacturing. Thereafter, the calibration is updated with the automatic calibration sequence as described below.

If the compass is not calibrated as checked in block 502, the procedure falls through to block 504 to place the point that represents the current measurement of the heading of the vehicle as measured by the electronic compass system near the origin of the Cartesian axes as shown on FIG. 1 and FIG. 2. This is done as described in the documents incorporated by reference.

Next, the procedure calls for the reading of point 1 and the reading of point 2 by the electronic compass system, each point being captured in memory after a turn in direction by the vehicle, thereby defining points on a circle. This is done in block 506.

Next, the electronic control system in block 508, through its microprocessor 10 reads an additional point 3, after the vehicle has changed direction again. At this juncture, more points can be taken, but for purposes of illustration, only three points will be described.

Next, in block 510, the microprocessor 10 calculates the center of the earth's magnetic field circle ($X_0$, $Y_0$) according to the formula shown above in the description of this invention, while at the same time, updating the direction and filtering the readings as described in the '843 patent, which has been incorporated herein by reference.

This includes the branching from block 510 to blocks 368 and 370 as described in the '843 patent in FIG. 5B.

Next, the procedure falls through to block 512 to check the center of the earth's magnetic field circle ($X_0$, $Y_0$) to see if it is near the origin. If it is, the method branches to block 514 to redefine point 2 as point 1 and then to redefine point 3 as point 2 proceeding next back through block 508 to read a new point 3 and continue with the procedure from there.

If the center of the earth's magnetic field circle ($X_0$, $Y_0$) is not near the origin, the method branches back to block 504 to place the point currently being measured near the origin and to begin the procedure once again. The purpose of this moving of the point being measured to a point near the origin is to allow for the maximum earth's magnetic field circle that can be measured in the defined graph of the Cartesian axes X and Y. The larger the graph, the more accurate the calibration.

Returning now to block 502, if the compass has been calibrated as checked in this block, the method falls through directly to block 512 to recheck the center of the earth's magnetic field circle represented by the Cartesian coordinates ($X_0$, $Y_0$) and continue with the rest of the procedure thereafter.

FIG. 6 represents an alternative embodiment of the method shown in FIG. 5. The item numbers are analogous to that done for FIG. 5 except for the use of block 616 which has no analog in FIG. 5. Each block in FIG. 6 has a corresponding block in FIG. 5. with the exact same step included except for the addition of performing some of the steps while updating direction and filtering information as described with respect to block 510. These blocks are marked with an asterisk.

Block 616 actually places $(X_0, Y_0)$ near the origin of the axes as opposed to waiting for the method in FIG. 5 to bring $(X_0, Y_0)$ to the origin. Block 616 can be done using quick ranging techniques as described in the documents incorporated by reference.

While the above-described method was developed for an electronic compass in an automotive vehicle, the principles are applicable to any electronically controlled compass employing a flux-gate or its equivalent; this includes compasses for aircraft and watercraft.

While the present invention has been disclosed in connection with the preferred embodiment thereof, it should be understood that there may be other embodiments which fall within the spirit and scope of the subject invention and that the invention is susceptible to modification, variation and change without departing from the proper scope or the fair meaning of the following claims.

I claim:

1. An automatic calibration method for use in an electronic compass control circuit that includes a microcomputer, a flux-gate, a flux-gate driver, a bandpass filter, a synchronous detector, an integrator and a summing amplifier; the control circuit equipped with a ranging circuit that includes an operational amplifier with resistive negative feedback connected to the output of the integrator; an RC charging network connected to the non-inverting input to the operational amplifier; a gate switch connected between the RC charging network and the microcomputer such that the microcomputer charges the RC charging network when the gate switch is closed; and comparator means to respond to the output of the integrator to control the operation of the gate switch; the calibration method for use with a vehicle equipped with a display for indicating information to the operator of the vehicle; the calibration method performed completely automatically while the operator the vehicle is driving the vehicle and comprising:

measuring and storing at least three compass headings, where each heading is measured and stored when the direction in which the vehicle is being driven changes;

deriving the coordinates for the center of the earth's magnetic field circle by using the compass headings;

computing directional offset values by using the coordinates for the center of the earth's magnetic field circle for use in magnetic compass heading computations thereby eliminating the effects of the vehicle's magnetic field on the reading of the direction that the vehicle is pointed, in the earth's magnetic field.

2. The automatic calibration method of claim 1 where the coordinates of the earth's magnetic field circle are found by deriving the intersection point of perpendicular bisectors taken of chords, the chords defined by straight lines formed by connecting the measured and stored compass headings.

3. The automatic calibration method of claim 2 where the automatic calibration is performed continuously.

4. The automatic calibration method of claim 2 where the automatic calibration is performed periodically.

5. The automatic calibration method of claim 1 where the automatic calibration is performed continuously.

6. The automatic calibration method of claim 1 where the automatic calibration is performed periodically.

7. An automatic calibration method for use in an electronic compass control circuit that includes a microcomputer and a flux gate; the calibration method for use with any moving vehicle on land, sea or air, the calibration method performed completely automatically while the operator of the vehicle is operating it comprising:

measuring and storing at least three compass headings, where each heading is measured and stored when the direction in which the vehicle is being driven changes;

deriving the coordinates for the center of the earth's magnetic field circle by using the compass headings;

computing directional offset values by using the coordinates for the center of the earth's magnetic field circle for use in magnetic compass heading computations thereby eliminating the effects of the vehicle's magnetic field on the reading of the direction that the vehicle is pointed, in the earth's magnetic field.

8. The automatic calibration method of claim 7 where the coordinates of the earth's magnetic field circle are found by deriving the intersection point of perpendicular bisectors taken of chords, the chords defined by straight lines formed by connecting the measured and stored compass headings.

9. The automatic calibration method of claim 8 where the automatic calibration is performed continuously.

10. The automatic calibration method of claim 8 where the automatic calibration is performed periodically.

11. The automatic calibration method of claim 7 where the automatic calibration is performed continuously.

12. The automatic calibration method of claim 7 where the automatic calibration is performed periodically.

* * * * *